(12) United States Patent
Abbott, III et al.

(10) Patent No.: US 7,079,735 B2
(45) Date of Patent: Jul. 18, 2006

(54) SYSTEM FOR SELECTING OPTICAL FIBER REELS FROM INVENTORY TO FILL AN ORDER

(75) Inventors: John S. Abbott, III, Elmira, NY (US); Ann R. Dyer, Cedar Rapids, IA (US)

(73) Assignee: Corning Incorporated, Corning, NY (US)

( * ) Notice: Subject to any disclaimer, the term of this patent is extended or adjusted under 35 U.S.C. 154(b) by 149 days.

(21) Appl. No.: 10/320,332

(22) Filed: Dec. 16, 2002

(65) Prior Publication Data

US 2003/0147608 A1 Aug. 7, 2003

Related U.S. Application Data

(60) Provisional application No. 60/341,740, filed on Dec. 17, 2001.

(51) Int. Cl.
*G02B 6/02* (2006.01)

(52) U.S. Cl. .......................... 385/123; 385/100; 385/98

(58) Field of Classification Search ................ 385/123, 385/100, 98
See application file for complete search history.

(56) References Cited

U.S. PATENT DOCUMENTS

| | | | |
|---|---|---|---|
| 4,261,639 A | 4/1981 | Kogelnik et al. ......... 350/96.15 |
| 5,042,906 A | 8/1991 | Chesler et al. .............. 385/123 |
| 5,050,091 A | 9/1991 | Rubin ........................ 364/488 |
| 5,119,307 A | 6/1992 | Blaha et al. ................. 364/468 |
| 5,191,631 A * | 3/1993 | Rosenberg .................. 385/123 |
| 5,274,733 A | 12/1993 | Prigent et al. .............. 385/123 |
| 5,315,436 A | 5/1994 | Lowenhar et al. .......... 359/569 |
| 5,359,523 A | 10/1994 | Talbott et al. ............... 364/468 |
| 5,500,800 A | 3/1996 | Talbott ....................... 364/468 |
| 5,522,004 A | 5/1996 | Djupsjöbacka et al. ..... 385/123 |
| 5,559,920 A | 9/1996 | Chraplyvy et al. ......... 385/123 |
| 5,613,028 A | 3/1997 | Antos et al. ................. 385/123 |
| 5,689,417 A | 11/1997 | Shockley et al. ....... 364/401 R |
| 5,696,614 A | 12/1997 | Ishikawa et al. ............ 359/124 |
| 5,719,696 A | 2/1998 | Chraplyvy et al. ......... 359/341 |
| 5,790,292 A | 8/1998 | Otsuka et al. ............... 359/173 |
| 5,842,192 A | 11/1998 | Garcia et al. ................. 706/45 |
| 5,943,245 A | 8/1999 | Melfi et al. ................. 364/512 |
| 6,005,997 A | 12/1999 | Robinson et al. ............. 385/24 |
| 6,021,230 A | 2/2000 | Cho et al. ................... 382/300 |
| 6,205,268 B1 | 3/2001 | Chraplyvy et al. ........... 385/24 |

(Continued)

*Primary Examiner*—Daniel Stcyr
*Assistant Examiner*—Daniel A. Hess
(74) *Attorney, Agent, or Firm*—Robert L. Carlson

(57) ABSTRACT

An optical fiber inventory selection system selects optical fibers from inventory for use in a communication network. In one embodiment, the system includes a vendor computer system that executes code that performs a number of steps. Initially, the system accesses a plurality of optical parameters for each of a plurality of optical fiber reels that are located in inventory. Next, a customer order is received that includes customer requirements for at least a portion of the plurality of optical parameters and a total optical fiber length, and may include requirements for sets of reels, blocks of sets, and batches of blocks. Then, two optical parameters are selected from the plurality of optical parameters that are included in the customer requirements. Next, a number of the optical fiber reels are combined into optical fiber reel pairs that meet the customer requirements for the selected two optical parameters. Finally, an appropriate number of the optical fiber reels are selected to meet the customer requirements for the total optical fiber length of the set. After selecting reels to make sets to the necessary requirements, the system may be used to select sets to make blocks and to select blocks to make batches of blocks.

19 Claims, 6 Drawing Sheets

U.S. PATENT DOCUMENTS

| | | |
|---|---|---|
| 6,311,002 B1 | 10/2001 | Evangelides et al. ....... 385/123 |
| 6,356,383 B1 | 3/2002 | Cornwell, Jr. et al. ...... 359/334 |
| 6,421,490 B1 | 7/2002 | Liu ............................ 385/127 |
| 6,496,631 B1 | 12/2002 | Tsukitani et al. ........... 385/123 |
| 2002/0181907 A1 | 12/2002 | Bickham et al. ............ 385/123 |
| 2003/0036930 A1* | 2/2003 | Matos et al. ................... 705/5 |

* cited by examiner

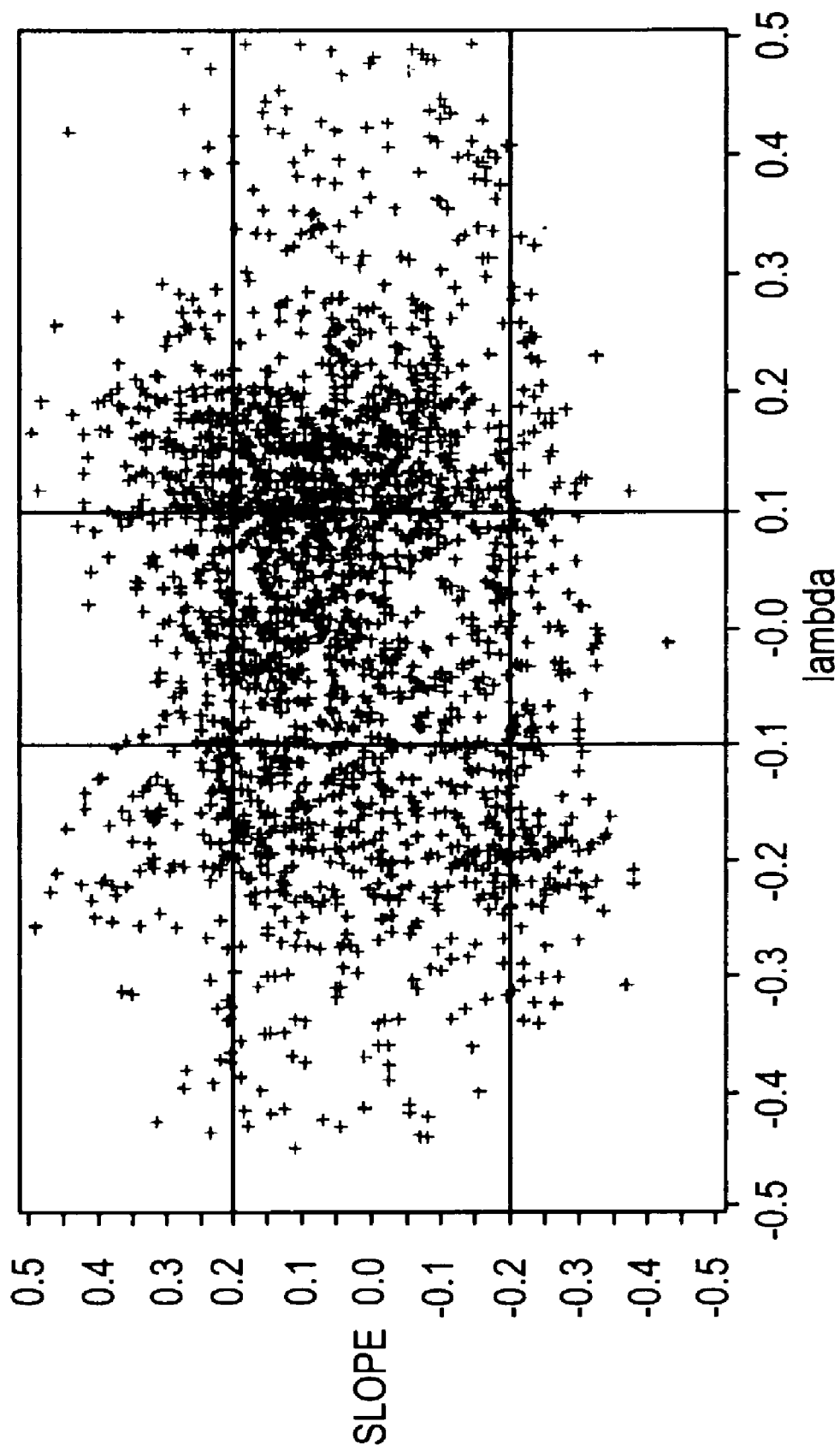

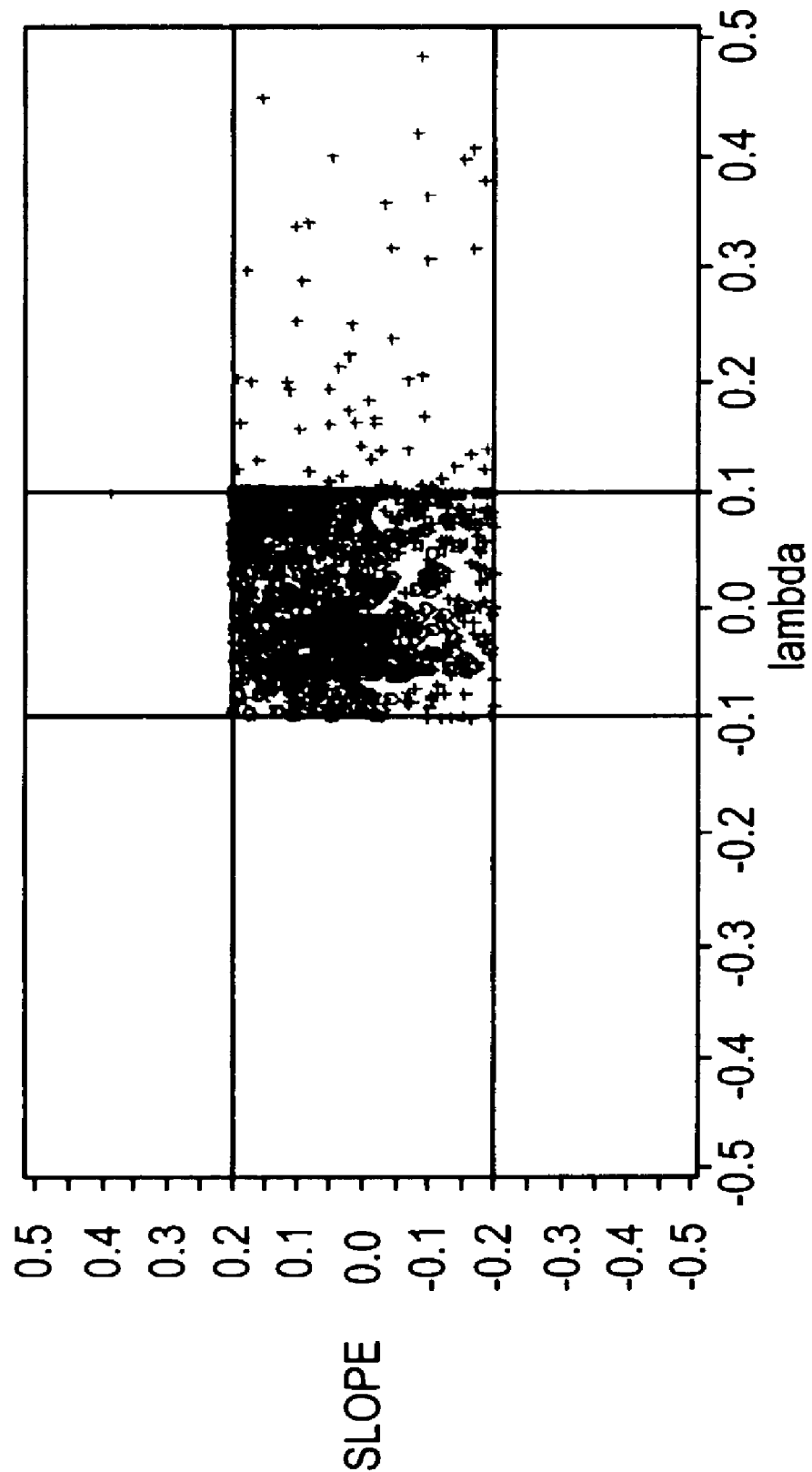

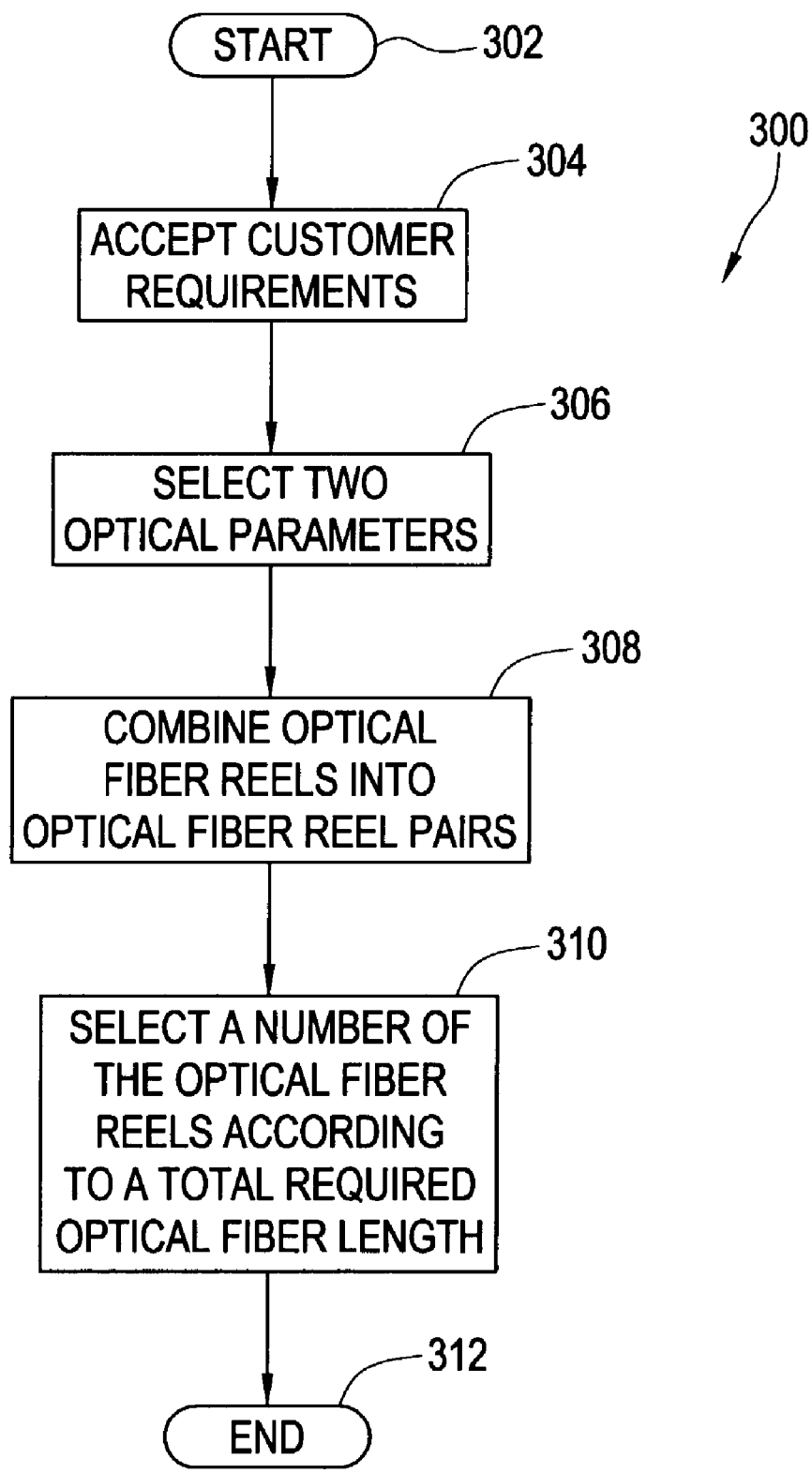

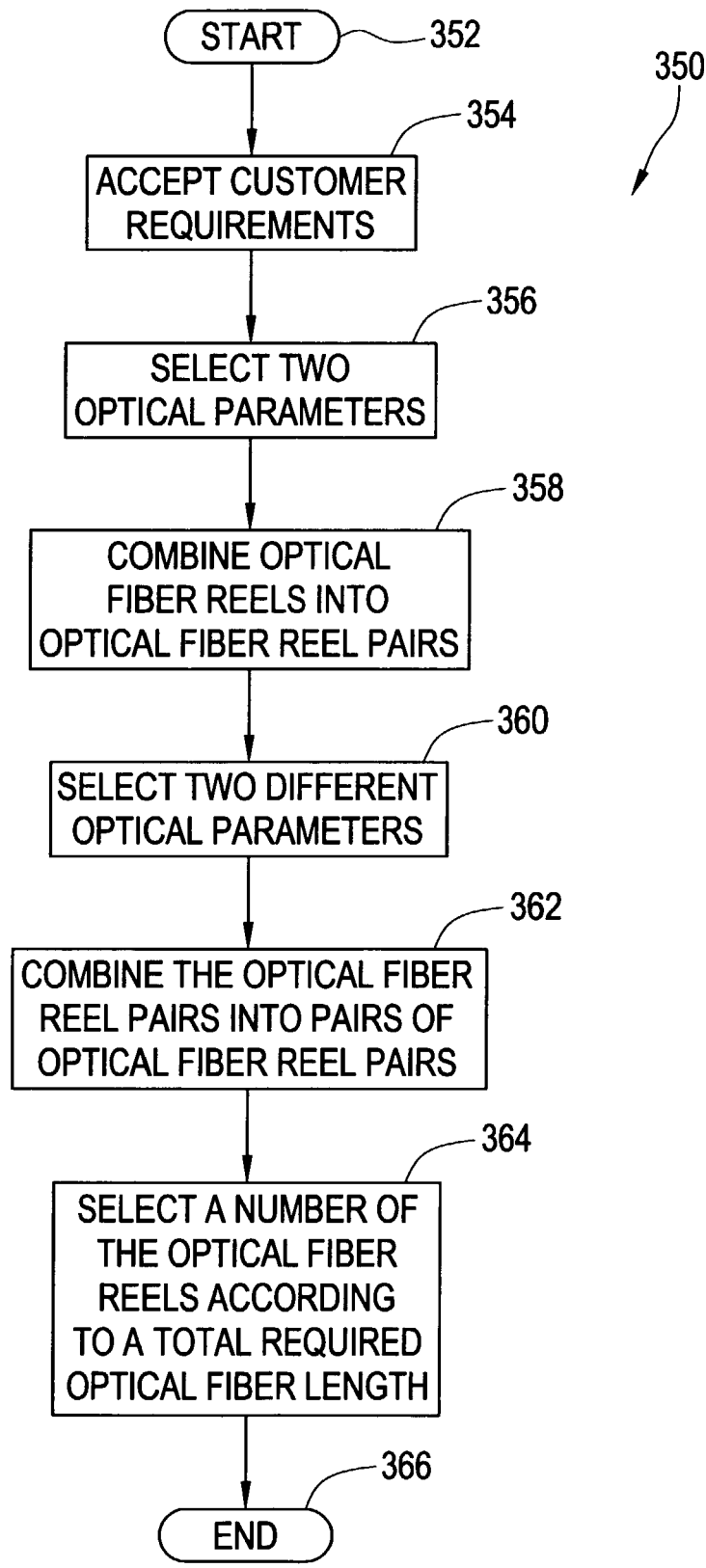

SYSTEM FOR SELECTING OPTICAL FIBER REELS FROM INVENTORY TO FILL AN ORDER

CROSS-REFERENCE TO RELATED APPLICATIONS

This application claims the benefit of priority under 35 U.S.C § 119(e) of U.S. Provisional Application Ser. No. 60/341,740 filed on Dec. 17, 2001.

BACKGROUND OF THE INVENTION

1. Field of the Invention

The present invention is generally directed to the selection of optical fibers and, more specifically, to the selection of optical fiber reels from inventory to fill an order, or to the selection of optical fiber reels from inventory to fabricate a cable or set of cables with specified optical parameters.

2. Technical Background

When an optical fiber is produced, the optical fiber is generally placed on a reel for storage within a warehouse, prior to shipment to a customer. Before the optical fiber reel is stored in the warehouse, however, various optical parameters of the optical fiber reel are normally recorded. When a customer order is received for optical fibers, optical fiber reels are generally selected so that when the optical fiber reels are assembled into final cables (e.g., submarine cables) customer requirements on the optical specifications may be met at a constituent (i.e., optical fiber reel), set (a number of optical fiber reels that will be spliced end-to-end to form a continuous fiber transmission line), block (a cable including all of the multiple sets that make up a cable) and batch (multiple cables) levels. For example, a customer may place an order for 3 cable lengths of 400 km (batch), each of the 3 cables having 100 fiber lengths (block), and each fiber length consisting of a number of fibers spliced together (sets) to form a correct length fiber which will then be assembled with 99 other fiber sets to form each cable. However, because of the number of different customer requirements and their stringency, many optical fiber reels fail to individually meet all of the customer requirements. By judiciously selecting optical fiber reels for use in a set, block, and/or batch, optical specifications can be tightened, thus, increasing a guardband and reducing variability at the set, block and/or batch level. The selection of the fibers may be done to meet specified optical parameters to enable fabrication of a set/block/batch with specific parameters for a standardized application, rather than for a specific customized customer order.

The selection of optical fiber reels from inventory for use in a submarine application, to fill a customer order, has typically been accomplished by two methods. A first method has been to manually select optical fiber reels from a spreadsheet (which contains various optical parameters on each optical fiber reel), such that the selected optical fiber reels, when combined, meet the customer requirements. However, manually selecting optical fiber reels from a spreadsheet is labor intensive, time consuming, seldom optimizes the optical parameters of the combined optical fiber reels and generally fails to optimize the use of inventory.

Thus, what is needed is a system and method for selecting optical fiber reels from inventory that provides the desired performance characteristics and which eliminates manual selection of reels while efficiently using inventory.

SUMMARY OF THE INVENTION

The present invention is directed to a system and method for selecting optical fibers from inventory and pairing sets of optical fiber reels having a different value for at least one optical property, so that the combined average for that property for those reels is improved, with respect to a desired target value, over the individual values of that property for each reel. In this way, optical fiber reels can be paired into optimized pairs of reels which can then be used in a communication network.

In one embodiment, an optical fiber inventory selection system includes a vendor computer system that executes code that performs a number of steps. Initially, a customer order is received that includes customer requirements for at least a portion of the plurality of optical parameters and a total optical fiber length. Next, the system accesses a plurality of optical parameters for each of a plurality of optical fiber reels that are located in inventory. Then, at least one, and preferably two optical parameters are selected from the plurality of optical parameters that are included in the customer requirements. Next, a number of the optical fiber reels are combined into optical fiber reel pairs that meet the customer requirements for the selected optical parameters. Finally, an appropriate number of the optical fiber reels are selected to meet the customer requirements for the total optical fiber length.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention.

BRIEF DESCRIPTION OF THE DRAWINGS

FIG. 2A is a graph depicting a distribution of an initial data set of a plurality of optical fiber reels indicating a zero dispersion wavelength and a zero dispersion slope for each of the optical fiber reels;

FIG. 2B is a graph depicting a distribution of a plurality of optical fiber reels and reel pairs after pairing of reels by an optical fiber selection routine, according to the present invention; and FIGS. 3A–3B are flow diagrams further depicting how fiber selection routines, according to different embodiments of the present invention, select optical fiber reels from inventory to fill a customer order.

DETAILED DESCRIPTION OF THE PREFERRED EMBODIMENT

The present invention is directed to a system and method for selecting optical fibers from inventory for use in a communication network. The present invention may be implemented with the assistance of a fiber selection routine that works by balancing the selection of optical fiber reels. That is, an optical fiber reel from one part (e.g., a left-half) of a fiber property distribution is paired with an optical fiber reel from an opposite part (e.g., a right-half) of the fiber property distribution such that the combined optical parameter of the pair is generally centered. While a large data set generally has its average at the mean of the distribution, the present invention pairs and matches the optical fiber reels so as to generally accurately center a set consisting of, for example, relatively few reels (e.g., four to eight).

When a set of individual optical fiber reels is reduced to a smaller set of carefully chosen pairs, the distribution of pairs is both more accurately centered and has a smaller spread or standard deviation. That is, the mean is closer to the target mean and the standard deviation, 'sigma', is reduced. Alternatively, the distribution of one or both opticals can be maintained by pairing reels from the left half of the distribution with other reels from the left half of the distribution and pairing reels from the right half of the distribution with other reels from the right half of the distribution. In general, a variety of pairing schemes can be used in order to obtain the desired distribution of pairs.

Preferably, the fiber selection routine selects at least one, and preferably two optical parameters for which the lowest percentage of the available optical fiber reels in inventory meet the customer order requirements. Then, optical fiber reels, which fail to meet one or both of the two optical specifications, are combined into pairs such that a length weighted average of each of the pairs meets both of the selected optical specifications. The routine steps through a series of possible pair combinations and once all possible pairs are made, the routine randomly selects optical fiber reels until a customer length requirement (i.e., a total optical fiber length) is met. If there are multiple requirements (set, block, and batch) this process may be repeated for each level of requirements.

Figure 1:
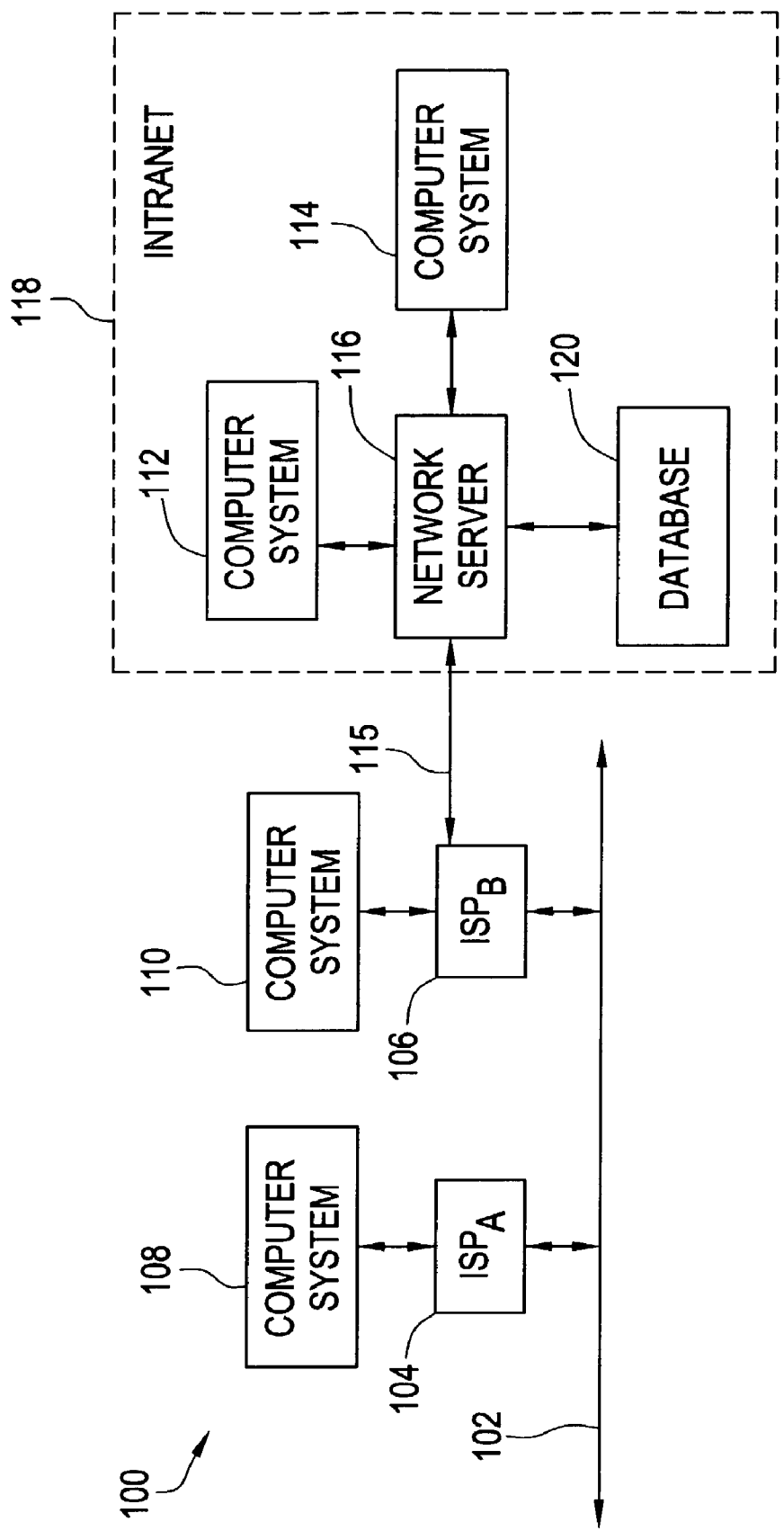
FIG. 1 is an electrical block diagram of an exemplary computer network that may be employed in practicing the invention.

Turning to FIG. 1, an exemplary computer network 100 is depicted. The exemplary computer network 100 includes four computer systems 108, 110, 112, and 114 that may communicate with a network server 116, located within an intranet 118 (e.g., a manufacturer local area network (LAN) or metropolitan area network (MAN)). According to the present invention, the network server 116 implements code, which provides a user interface, which facilitates communication between the network server 116 and a user of one or more of the computer systems 108–114. As shown in FIG. 1, the computer system 108 is coupled to an Internet service provider ($ISP_A$) 104, via, for example, a T1 line and the computer system 110 is coupled to an Internet service provider ($ISP_B$) 106, via, for example, a cable modem. The Internet service providers $ISP_A$ 104 and $ISP_B$ 106 are coupled to a communication link 102 (e.g., a public switched telephone network (PSTN)), which forms part of the computer network. The link 102 may, however, take other forms, such as broadband cable, wireless, etc. As shown, the network server 116, of the intranet 118, is also coupled to $ISP_B$ 106, via link 115, which is, for example, a T1 line. In this manner, the computer systems 108 and 110 can communicate with the network server 116 or computer systems 112 and 114, via the network server 116. Any of the computer systems 108–114 may represent a user (e.g., an external or internal customer) computer system that is in communication with the network server 116, so as to provide a customer order, including customer requirements for at least a portion of a plurality of optical parameters and a total optical fiber length. Of course, more or less computers could be employed as desired, and only a single computer can be used, if desired, to carry out the invention. The requirements may be for a standardized application without a specific customer order, or may be in response to a specific customized customer order.

According to one preferred embodiment of the present invention, the network server (e.g., a vendor computer system) 116 implements code, which allows the network server 116 to communicate with the user computer system 108 or 110, as well as other computer systems. The network server 116 also implements fiber selection code, which allows the network server 116 to perform a number of steps. Initially, the network server 116 receives a customer order that includes customer requirements for at least a portion of a plurality of optical parameters and a total optical fiber length for a communication network from a user via, for example, the user computer system 108. Next, the code running on the network server 116 selects at least one, and preferably at least two optical parameters, from the plurality of optical parameters that are included in the customer requirements. Then, the code combines the optical fiber reels into a number of optical fiber reel pairs such that the reel pairs meet the customer requirements for the selected optical parameters. Finally, the code selects an appropriate number of the optical fiber reels to meet the customer requirements for the total optical fiber length.

The plurality of optical parameters may include an attenuation at a specific wavelength, an attenuation at a water peak, a maximum attenuation over a wavelength range, an attenuation with bending, a cable cutoff wavelength, a zero dispersion wavelength, a zero dispersion slope, a maximum dispersion over a wavelength range, a range of desired dispersion for a particular wavelength, or a polarization mode dispersion value. It should be appreciated that other optical parameters can also be utilized.

While the computer system 108 preferably accesses the network server 116, via the Internet, it should be appreciated that the network server 116 may be locally accessed or operated by a user through the computer systems 112 or 114 (e.g., through a local area network (LAN)) or may be accessed by another computer system through a dial-up connection. Preferably, the network server 116 includes a database 120 (stored on a mass storage device) that stores information (e.g., optical specifications and lengths) on each of the optical fiber reels currently in inventory. However, it is contemplated that the computer system 114 may be a file server that communicates with the network server 116 and stores the information on the plurality of optical fiber reels in a database. Communication between the network server 116 and the computer systems 108–114 may also be facilitated by a plurality of web pages. The data for a 'collection' of fibers, a subset of the total available fiber in inventory, is pulled from the database. The 'collection' includes only reels meeting the individual (constituent) optical requirements, and typically is only a subset of the available reels.

FIGS. 2A and 2B are exemplary graphs depicting a distribution of optical fiber reels indicating a deviation amount from a desired zero dispersion wavelength and a deviation amount from a desired zero dispersion slope for each of the optical fiber reels in the collection. The collection could be all or a portion of a particular fiber type that is in inventory. As shown in FIG. 2A, the deviation from desired zero dispersion wavelength is plotted along the abscissa and the deviation from desired zero dispersion slope is plotted along the ordinate. As shown, the grid is divided into nine cells numbered starting with the first cell being in the lower left hand corner and increasing as one goes clockwise around the center cell, which is cell number 9. (see Table 1, below) As a general rule, there can be up to four levels of optical specifications; a first optical specification on the optical fiber reel (constituent), a second optical specification on a set of optical fiber reels, a third optical specification on a cable (block) and a fourth optical specification at a batch level. Typically, these specifications are tighter at each level. Thus, constituents have the broadest specifications and batches have the tightest specifications. This is shown in the exemplary graph FIG. 2A. Zero dispersion wavelength (scaled by the upper and lower spec limits for the individual reel, so that the center of the scaled spec range is 0.0 and the width of the scale spec range is 1.0) is plotted versus dispersion slope at the zero dispersion wavelength (similarly scaled). Each data point, indicated by a plus (+) sign, corresponds to an individual fiber reel. As shown in FIG. 2A, the individual optical fiber reels meet all the individual (i.e., constituent) requirements and do not display any failing optical fiber reels. However, on this scaled plot, the more preferred tighter specifications for the set level are also plotted, the scaled set specs being +/−0.1 for zero dispersion wavelength $\lambda_0$ and +/−0.2 for dispersion slope. Each set, which is to include a number of the optical fiber reels from inventory, is required to meet these tighter optical specifications (defined by the center cell, i.e., cell 9). FIG. 2B illustrates the average amount of deviation from the optimum desired slope and zero dispersion wavelength, for a number of fibers that have been paired together in accordance with the invention. In particular, FIG. 2B illustrates the results that are achieved by combining fibers from cell 1 with cell 5, cell 2 with cell 6, cell 3 with cell 7, and cell 4 with cell 8. This embodiment optimizes two optical parameters at a time. Alternatively, a single optical parameter could also be optimized, or a plurality of optical parameters could be optimized one at a time. Remaining unpaired fibers are still indicated by a plus (+) sign, and the remainder of the data points illustrated are of paired fiber sets. As shown in FIG. 2B, in order for a set of reels to be acceptable, the zero dispersion wavelength of an optical fiber reel set must have a scaled value between −0.1 and +0.1, and the zero dispersion slope must have a scaled value between −0.2 and +0.2. It should be apparent from viewing FIG. 2A that a random selection of optical fiber reels may not efficiently generate a set whose average opticals are in the center cell (i.e., cell 9) of the grid. However, after pairing the optical fiber reels, as is shown in FIG. 2B, utilizing a fiber selection routine according to the present invention, the majority of paired sets lie in the center cell. It will be appreciated that building sets from these pairs can be done quickly and efficiently utilizing practically the entire inventory, as shown in FIG. 2B.

According to another embodiment of the present invention, even the relative few reels outside the center cell of FIG. 2B can be utilized since they may be combined with pairs in the center cell. After having generated a number of pairs, as shown in FIG. 2B, a new nine cell plot can be generated for two additional optical requirements and pairs of pairs can be matched in sequence so that third and fourth opticals are centered for each group of fibers. It should be appreciated that according to the present invention, sets of 'n' reels that center 'n' opticals and use substantially all of the current inventory can be readily generated.

Accordingly, the present invention readily generates a set of fibers with centered opticals that effectively make use of a relatively broad distribution of optical fiber reels even when the requirements for a set of optical fiber reels are relatively stringent. As described above, this is accomplished by a computer program that matches optical fiber reels so that the optical parameters balance out. It should be appreciated that the two-dimensional graphs of FIGS. 2A and 2B can be extended to three, four or more parameters. It should also be appreciated that grids with a different number of cells (e.g., sixteen cells) can be utilized to organize the 'pairing' of the data, or a hierarchical sequence of grids (e.g., 64, then 16 cells) can be used to quickly optimize pairs. Alternatively, a 'best pair' for a given optical fiber reel can be determined by using a "figure of merit" for the opticals after pairing, with a program searching a subset or an entire data set to determine an optimal pair. The choice of search algorithm depends on the relative importance of the speed of selection, tightening of the distribution, or handling of large inventory and the initial distribution of the opticals relative to the final requirements.

Turning to FIG. 3A, a fiber selection routine 300, according to one embodiment of the present invention, is illustrated. In step 302, the routine 300 is initialized at which point control transfers to step 304, where the routine 300 accepts the customer or standardized requirements. It will be appreciated that the customer requirements may be locally input directly into a computer system running the routine 300 or may be input remotely, via a computer network. Then, in step 306, the routine 300 preferably selects one or more (in this case, two) optical parameters for which the greatest number of optical fiber reels in inventory fail to meet the customer requirements. Next, in step 308, the routine 300 causes optical fiber reels to be combined into optical reel pairs, that when combined have centered optical parameters. Then, in step 310, the routine 300 selects a number of the optical fiber reels according to a total required optical fiber length. Finally, in step 312, the routine 300 terminates.

Moving to FIG. 3B, a fiber selection routine 350, according to another embodiment of the present invention, is illustrated. In step 352, the routine 350 is initiated. Next, in step 354, the routine 350 accepts the customer or standardized requirements. Then, in step 356, the routine 350 selects at least one (in this case two) optical parameters. Next, in step 358, the routine 350 combines the optical fiber reels into optical fiber reel pairs. Then, in step 360, the routine 350 selects one or more (in this case two) different optical parameters. Next, in step 362, the routine 350 combines the two optical fiber reel pairs into pairs of optical fiber reel pairs. Then, in step 364, the routine 350 selects a number of the optical fiber reels according to a total required optical fiber length before terminating at step 366.

General Fiber Selection Routine Implementetion

According to the present invention, optical fiber reel selection from inventory is preferably performed by a routine that selects a number of optical fiber reels, to fill a customer order. In the discussion below, the terms are defined as follows: 'A' signifies any given cell 1–9; 'B' signifies any given cell 1–9; 'USL' is an upper specification limit for the opticals; 'LSL' is a lower specification limit for the opticals; 'optical 1' is the worst optical; 'optical 2' is a second worst optical; 'opt1' is optical 1; 'opt2' is optical 2;

'opt1LSL' is the LSL for optical 1; 'opt1USL' is the USL for optical 1; 'opt2LSL' is the LSL for optical 2; 'opt2USL' is the USL for optical 2; 'numcell1' is the number of reels in cell 1; 'numcell2' is the number of reels in cell 2; 'numcell3' is the number of reels in cell 3; 'numcell4' is the number of reels in cell 4; 'numcell5' is the number of reels in cell 5; 'numcell6' is the number of reels in cell 6; 'numcell7' is the number of reels in cell 7; 'numcell8' is the number of reels in cell 8; 'lenA' is the length of a reel from cell A; 'lenB' is the length of a reel from cell B; 'opt1A' is the optical 1 for a reel from cell A; 'opt2A' is the optical 2 for a reel from cell A; 'opt1B' is the optical 1 for a reel from cell B; and 'opt2B' is the optical 2 for a reel from cell B.

Initially, the routine selects the two worst opticals (optical 1 and optical 2), which correspond to the optical parameters with, for example, the least kilometers within the selected optical specification. Preferably, the selection is based on the most restrictive specification for each optical and can be at a set, block or batch level. Next, the routine selects the LSL and USL limits for a nine cell grid. For selected opticals with only a USL, the lower specification limit is preferably set to one of an extremely low number, zero for opticals that only have positive values, the LSL for the constituent reels or the lowest value of all reels in the data set. For selected opticals with only a LSL, the upper specification limit is preferably set to one of an extremely high number, the USL for the constituent reels or the highest value of all reels in the data set. Alternatively, the LSL and USL limits for the 9 cell grid can be set to any value to achieve the outcome desired by the user.

Each optical fiber reel is then assigned to a cell number of a nine cell grid, as shown below in Table 1, and the number of reels in each of the cells 1 through 8 is counted. A reel with an optical below the LSL for optical 1 is assigned to either cell 1, 2 or 3. A reel with an optical above the USL for optical 1 is assigned to either cell 7, 6 or 5. A reel with an optical between the LSL and the USL for optical 1 is assigned to either cell 8, 9 or 4. A reel with an optical below the LSL for optical 2 is assigned to either cell 1, 8 or 7. A reel with an optical above the USL for optical 2 is assigned to either cell 3, 4 or 5. A reel with an optical between the LSL and USL for optical 2 is assigned to either cell 2, 9 or 6.

TABLE 1

|              | 3 | 4           | 5 |
| ------------ | - | ----------- | - |
| (optical 2)  | 2 | 9           | 6 |
|              | 1 | 8           | 7 |
|              |   | (optical 1) |   |

In general, the routine assigns the reels to a particular cell (i.e., cell=1 through cell=9) and counts the reels in each cell (i.e., numcell1 through numcell8) as follows:

if opt1<opt1LSL AND opt2<opt2LSL then cell=1 and numcell=numcell1+1 if opt1<opt1LSL AND opt2LSL<=opt2<=opt2USL then cell=2 and numcell2=numcell2+1 if opt1<opt1LSL AND opt2>opt2USL then cell=3 and numcell3=numcell3+1 if opt1LSL<=opt1<=opt1USL AND opt2>opt2USL then cell=4 and numcell4=numcell4+1 if opt1>opt1USL AND opt2>opt2USL then cell=5 and numcell5=numcell5+1 if opt1>opt1USL AND opt2LSL<=opt2<=opt2USL then cell=6 and numcell6=numcell6+1 if opt1>opt1USL AND opt2<opt2LSL then cell=7 and numcell7=numcell7+1 if opt1LSL<=opt1<=opt1USL AND opt2<opt2LSL then cell=8 and numcell8=numcell8+1 if opt1LSL<=opt1<=opt1USL AND opt2LSL<=opt2<=opt2USL then cell=9

Pairs of two optical fiber reels are then formed such that the length weighted average of the two optical fiber reels falls within optical specifications for both selected optical parameters (i.e., the opticals for cell 9). Preferably, the routine pairs reels from opposite corners (i.e., cells 1 and 5; cells 3 and 7); pairs reels from corners with reels from opposite middles (i.e., cells 1 and 6; cells 3 and 6; cells 5 and 2; cells 7 and 2; cells 3 and 8; cells 5 and 8; cells 1 and 4; and cells 7 and 4) paired in order of the cell pairs containing the largest number of reels; pairs reels from adjacent middle cells (i.e., cells 4 and 6; cells 6 and 8; cells 2 and 8; and cells 2 and 4) paired in order of the cell pairs containing the largest number of reels; pairs reels from opposite middles (cells 4 and 8; and cells 2 and 6).

Additional pairing schemes can be implemented if advantageous. Cell 9 single reels and non-cell 9 single reels can be combined to make pairs. Cell 9 pairs and non-cell 9 reels can be combined to make triplets. Multiple pairings can be made which result in quadruplets, etc. (cell 9 triplet combined with non-cell 9 reel). As a general rule, making cell 9/non cell 9 pairs is advantageous for sets consisting of 2 reels and making triplets and higher is advantageous for sets consisting of many reels.

As shown below in Table 2, the routine preferably implements a pre-pair sorting method and a pair search method that sorts cell A optical*length from worst to best, sorts cell B optical*length from worst to best, makes one pass through cell A opticals looking for pairs, where cell A is the cell with the fewest reels and then makes 'n' pass through cell B opticals, where 'n' is the number of records in cell A. The pre-pair sorting is modified as appropriate for other grids. For example, a $2^N \times 2^N$ grid will match cell (I,J) with cell (N-I+1,N-J+1), the cell symmetrically opposite the 'center' of the grid.

TABLE 2

|          | cell Number | Primary sort optical 1 | Secondary sort Optical 2 | cell number | primary sort optical 1 | Secondary sort Optical 2 |
| -------- | ----------- | ---------------------- | ------------------------ | ----------- | ---------------------- | ------------------------ |
| Opposite | 1           | ascending              | Ascending                | 5           | descending             | Descending               |
| Corners  | 3           | ascending              | Descending               | 7           | descending             | Ascending                |
| Corners  | 1           | ascending              | Ascending                | 6           | descending             | Descending               |
| And      | 3           | ascending              | Descending               | 6           | descending             | Ascending                |
| Opposite | 5           | descending             | Descending               | 2           | ascending              | Ascending                |
| Middles  | 7           | descending             | Ascending                | 2           | ascending              | Descending               |
|          | 3           | ascending              | Descending               | 8           | descending             | Ascending                |

TABLE 2-continued

|  | cell Number | Primary sort optical 1 | Secondary sort Optical 2 | cell number | primary sort optical 1 | Secondary sort Optical 2 |
|---|---|---|---|---|---|---|
|  | 5 | descending | Descending | 8 | ascending | Ascending |
|  | 1 | ascending | Ascending | 4 | descending | Descending |
|  | 7 | descending | Ascending | 4 | ascending | Descending |
| Adjacent | 2 | ascending | Ascending | 4 | descending | Descending |
| Middles | 8 | ascending | Ascending | 6 | descending | Descending |
|  | 4 | ascending | Descending | 6 | descending | Ascending |
|  | 2 | ascending | Descending | 8 | descending | Ascending |
| Opposite | 2 | ascending | Ascending | 6 | descending | Descending |
| Middles | 4 | ascending | Descending | 8 | descending | Ascending |
| Corners | 1 | ascending | Ascending | 9 | descending | Descending |
| And | 3 | ascending | Descending | 9 | descending | Ascending |
| cell 9 | 5 | descending | Descending | 9 | ascending | Ascending |
|  | 7 | descending | Ascending | 9 | ascending | Descending |
| Middles | 2 | ascending | Ascending | 9 | descending | Descending |
| And | 4 | descending | Descending | 9 | ascending | Ascending |
| cell 9 | 6 | descending | Ascending | 9 | ascending | Descending |
|  | 8 | ascending | Ascending | 9 | descending | Descending |

The following code can be utilized to determine passing pairs:

```
if
{opt1LSL*(lenA+lenB)<=(opt1A*lenA+opt1B*lenB)
    <=opt1USL*(lenA+lenB) and
opt2LSL*(lenA+lenB)<=(opt2A*lenA+opt2B*lenB)
    <=opt2USL*(lenA+lenB) and used in a pair=false}
then
{used in a pair=true
fiberid=fiber id reel from cell A concatenated with fiber id
    reel from cell B
length=lenA+lenB
opt1=(opt1A*lenA+opt1B*lenB)/(lenA+lenB)
opt2=(opt2A*lenA+opt2B*lenB)/(lenA+lenB) cell=9
numcellA=numcellA-1
numcellB=numcellB-1}
```

Among other techniques, a length weighted average or a length weighted quadrature average (for polarization mode dispersion (PMD)) may be used. The routine then selects two cells to pair, sorts cells according to cell sort order and uses pair making logic to make pairs until no more pairs can be made.

For the case of two reel set size, pairs need to have all opticals within specification and meet the specified length requirement. However, in certain cases, it is contemplated that all opticals may not need to pass for each pair. This generally increases the number of outliers that can be used.

Pair making logic for sets composed of two reels can potentially be expanded as follows:

```
if
{opt1LSL*(lenA+lenB)<=(opt1A*lenA+opt1B*lenB)
    <=opt1USL*(lenA+lenB) and
opt2LSL*(lenA+lenB)<=(opt2A*lenA+opt2B*lenB)
    <=opt2USL*(lenA+lenB) and
opt3LSL*(lenA+lenB)<=(opt3A*lenA+opt3B*lenB)
    <=opt3USL*(lenA+lenB) and
opt4LSL*(lenA+lenB)<=(opt4A*lenA+opt4B*lenB)
    <=opt4USL*(lenA+lenB) and
etc. for all opticals
min set length<=(lenA+lenB)<=max set length and
used in a pair=false }
```

Pairs may also be based on the number of problem opticals. For example, if there were three problem opticals, the pair making logic can be:

```
if
{opt1LSL*(lenA+lenB)<=(opt1A*lenA+opt1B*lenB)
    <=opt1USL*(lenA+lenB) and
opt2LSL*(lenA+lenB)<=(opt2A*lenA+opt2B*lenB)
    <=opt2USL*(lenA+lenB) and
opt3LSL*(lenA+lenB)<=(opt3A*lenA+opt3B*lenB)
    <=opt3USL*(lenA+lenB) and
used in a pair=false}
```

Then, the routine preferably randomly selects from cell 9 pairs, cell 9 single reels and non-cell 9 reels to make reel sets. Preferably, sets are formed with pairs and then cell 9 single reels and non-cell 9 reels. This can be accomplished by assigning a random number to each pair or reel and sorting the data using the random number so that a file contains randomly sorted pairs at the top and randomly sorted single reels at the bottom. Preferably, for each set the routine makes one pass through the file flagging selected reels. Once the set length size is reached or the end of the file is encountered, the routine returns to the top of the file to begin selection of the next set. However, using this approach sets can be assigned which never reach the set length requirement. Thus, the number of attempted sets needs to be greater than the number of required sets.

Assuming that minimum set size, maximum set size, and minimum reel length come from customer order requirements, the following code can be utilized to determine if a given length required is met.

```
min reel length=max(customer min reel length, min reel
    length in data set)
do i=1 to (number of sets to attempt)
sum km in set=0
do j=1 to (number records in data set)
/* check to see if reel can be selected for a set */
if {(sum km in set+length<min set size-min reel length)
    or
(sum km in set+length>=min set size and sum km in
    set+length<=max set size)}
and
set number=not assigned
then
/* add reel length to kms in set and assign set number */
do
(sum km in set)+length
set number=i
end
```

```
/* if length requirement met for set—jump out of loop */
if (sum km in set)>=min set size and (sum km in set)
    <=max set size
  then j=(number records in data set)+1
  end
end
```

Preferably, the selection of the two worst opticals are based on the most restrictive of all specifications (at a set, block, or batch level).

In general, the process of combining sets into blocks and blocks into batches uses the same 9 cell grid approach as the process for combining reels into sets. Preferably, the same two opticals in the 9 cell grid are used for filling each level of the order. Alternatively, one can calculate the percent of sets outside the block limits to select the worst two opticals for the block 9 cell grid and calculate the percent of blocks outside the batch limits to select the worst two opticals for the batch 9 cell grid. To make blocks from sets, the 9 cell grid uses block LSL & USL and length weighted average opticals of passing sets. To make batches from blocks, the 9 cell grid uses batch LSL & USL and length weighted average opticals of passing blocks.

Additional logic is used to maximize the number of blocks and batches that can be made.

This logic addresses the issue of not having enough single sets after 9 cell grid pairing to make blocks consisting of an odd number of sets and likewise not having enough single blocks after 9 cell grid pairing to make batches consisting of an odd number of blocks.

For example, say an order requires 7 sets/block and the algorithm has generated 2 triples of sets, 20 pairs of sets, and 5 single sets. The maximum number of blocks that could be generated is 5 (1 block consisting of 2 triples of sets & 1 single set and 4 blocks consisting of 3 pairs of sets & 1 single set). The 8 remaining pairs of sets (16 sets) cannot be combined into blocks of 7 sets.

This issue is resolved by adding logic that creates a usable mix of triples, pairs, and singles to the 9 cell grid pair making process for blocks and batches. This is accomplished by adding counters to the code which keep a tally of the number of single sets, pairs of sets, triples of sets, etc. that have been generated. Each possible number of sets/block or blocks/batch has its own usable mix of triples, pairs, and singles. The algorithm stops pairing when the limit of the usable mix is reached. Using this logic in the above example the algorithm would stop when it has generated 2 triples of sets, 18 pairs of sets, and 9 single sets. These triples, pairs and singles could then be combined into 7 blocks (1 block consisting of 2 triples of sets & 1 single set and 6 blocks consisting of 3 pairs of sets & 1 single set). Only 2 single sets are unusable.

Alternatively, the algorithm could break pairs (and triples) up when needed to maximize the number of block or batches that can be made.

In another preferred embodiment of the invention, reels for different fiber types are selected to form an optimized combination of fiber reels which cab ne employed in a multi-fiber span in a telecommunications system. For example, so called dispersion managed systems can be comprised of a first fiber having positive dispersion at 1550 and positive slope, followed by a second fiber having negative dispersion and negative dispersion slope at 1550 nm. In one such embodiment, the fiber selection process may be broken down into three major components: (1) generating a selection of fiber sets having positive dispersion (+D) at a desired wavelength; (2) generating a selection of fiber sets having negative dispersion (−D) at the desired wavelength; and (3) matching appropriate +D fibers from the first set with appropriate −D fibers from the second set to arrive at a combination of +D and −D fibers which together form the desired residual dispersion and slope at a particular wavelength for the dispersion managed fiber combination which will be used in the telecommunications system. To generate the selection of +D and −D fiber sets, single reels of +D and −D fiber may be selected, or alternatively, each of the +D and −D fiber sets can be first optimized by combining two or more reels of a single (i.e., +D or −D) fiber type to from a combined pair length of such fibers which is optimized to be within a particular target range for one or more optical properties. Such +D and −D fiber sets can be generated, for example, using the 9 cell grid approach which was described hereinabove.

Figure 4:
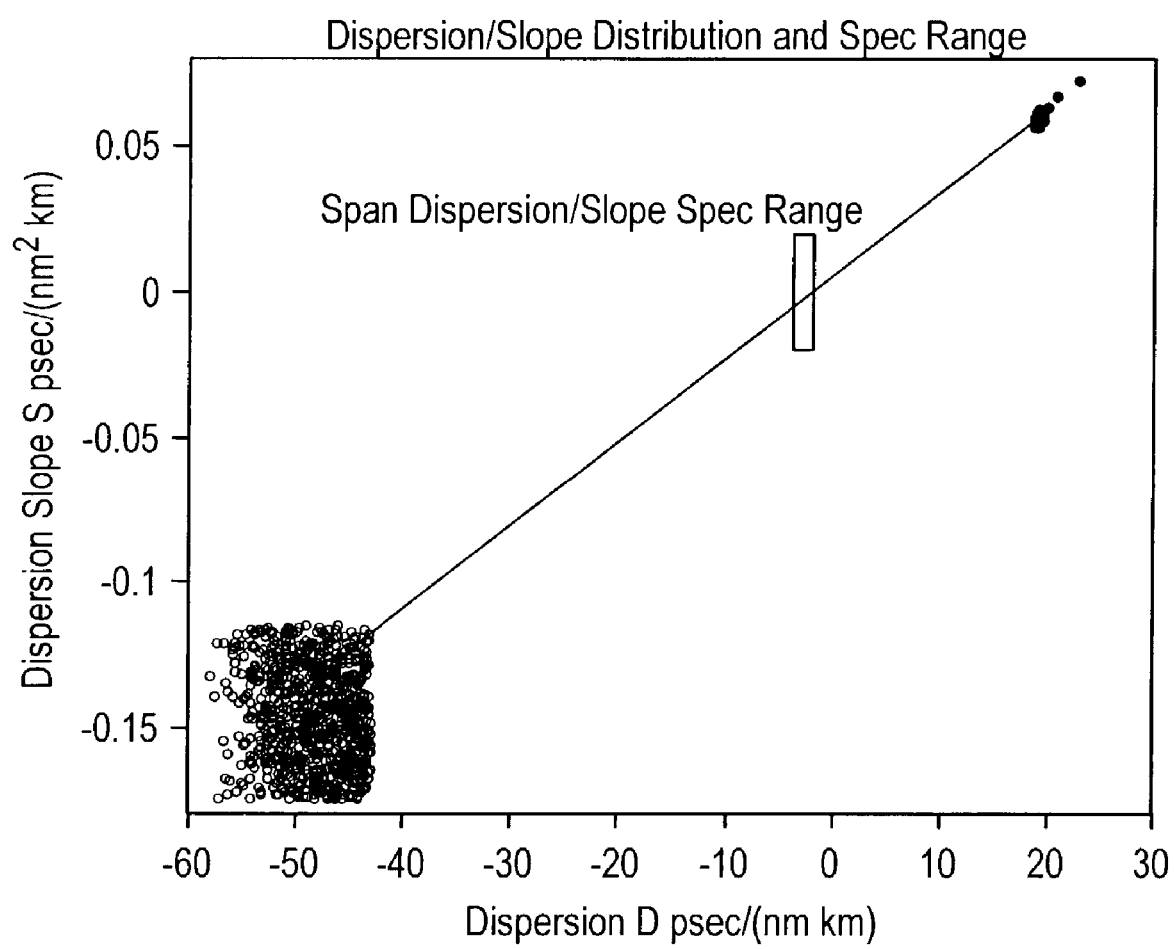
FIG. 4 is a graph depicting a first distribution of negative dispersion, negative dispersion slope fibers and a second distribution of positive dispersion, positive dispersion slope fibers, which can be combined to form dispersion managed fiber pairs.

FIG. 4 illustrates optical dispersion and dispersion slope distributions for a first set of hypothetical positive dispersion fibers and a second set of hypothetical negative dispersion fibers which are to be combined together to form a dispersion managed fiber span for use in a telecommunications system. The desired dispersion and dispersion slope specification range which is to occur when the two fibers are combined is defined by the box which is located at the intersection near the zero point on each axis. Each of the two different fiber types are manufactured to a target dispersion and slope value which is generally located in the center of the manufacturing distribution of each fiber. Consequently, in order to optimize the performance of the majority of fiber pairs which can be selected from the two manufacturing distributions and combined to form a dispersion managed pair, it is desirable to pair a +D fiber which has a slightly higher than target positive dispersion with a −D fiber that exhibits a slightly lower than target negative dispersion. In the embodiment illustrated, the target residual dispersion and slope box is shifted slightly to the negative side for a dispersion, as the desired residual dispersion is centered around −2.75 ps/nm-km . In this embodiment, the total desired length for the optical fiber span is 45 km and the dispersion of the negative dispersion fiber is approximately twice the magnitude of the dispersion of the positive dispersion fiber at 1550 nm. Consequently, by arranging the length of the respective fibers so that the length of the positive dispersion fiber is approximately twice that of the negative dispersion fiber, the resultant dispersion can be made to be zero, or slightly negative or slightly positive, as desired (or −2.75, as is the case with this example). As can be seen in FIG. 4, the manufacturing distribution of the negative dispersion fiber is larger than that of the positive dispersion fiber, as a result of the negative dispersion fiber being more difficult to manufacture. In order for a combination of +D and −D fibers to fall within the target specification range, as illustrated in FIG. 4, a line drawn between the two selected fibers must fall within, or cross through the desired target span specification range. In other words, pairs of +D and −D fiber are selected so that, for a given desired length combination, the resultant residual dispersion slope and dispersion values fall within the target box. However, in some instances, portions of the distribution of the existing −D fiber reels may not be readily combinable with existing +D fiber reels to arrive at a combined fiber that exhibits a combined dispersion and slope that falls within the target range, or more preferably in the center of the target range. For example, fibers from the upper left hand corner or lower right hand corner of the −D fiber distribution might not be combinable with the +D fibers illustrated to fall within the center of the target range. This problem can be averted, however, by first combining lengths of two or more reels of the −D fiber type which are at opposite ends of the product distribution (for example, by using the 9 cell product distribution combination approach described above), to from a combined pair length of −D fiber, that falls within the center (or closer to the center) of the desired −D product target, and the resultant combination −D fiber can then be combined with the +D fiber to form a dispersion managed pair that is optimized within the target region illustrated in FIG. 4. In this way, a first reel of fiber, for example which exhibits negative dispersion and negative dispersion slope at 1550 nm which is lower or higher than a desired target distribution for said first fiber, and a second reel of fiber of the same fiber which exhibits positive dispersion and dispersion slope at 1550 nm which is lower or higher than a desired target distribution for said second fiber may be combined so that a fiber having a dispersion or slope that is lower than the desired target for that fiber is combined with a fiber having a dispersion or slope which is higher than the desired target for that same type of fiber, and thereafter the resultant fiber could be combined with a positive dispersion fiber to form a dispersion managed pair.

EXAMPLE 1

Example 1 assumes that reels in cell 3 are to be combined with reels in cell 7. Table 3, shown below, lists the relevant specifications for the reels in cell 7 and Table 4, shown below, lists the relevant specifications for cell 3. Tables 3 and 4 include the following information: optical 1 is lambda (worst optical); optical 2 is slope (second worst optical); primary sort is lambda*length; secondary sort is slope*length; cell 3—lambda*length sort is ascending, slope*length sort is descending; cell 7—lambda*length sort is descending, slope*length sort is ascending; number of records in cell 7 is thirty-nine; and the number of records in cell 3 is one hundred. The routine makes one pass through cell 7 and thirty-nine passes through cell 3 looking for pairs. The results of the pair making are shown below in Table 5.

TABLE 3

| CELL | ID | LENGTH | LAMBDA | LAMBDA* LENGTH | SLOPE | SLOPE* LENGTH |
|---|---|---|---|---|---|---|
| 7 | 1941 | 25.2 | 1591.24 | 40099.22 | 0.0657 | 1.6556 |
| 7 | 1837 | 25.2 | 1589.13 | 40046.18 | 0.0652 | 1.6430 |
| 7 | 1719 | 25.2 | 1588.32 | 40025.66 | 0.0644 | 1.6229 |
| 7 | 1492 | 25.2 | 1587.53 | 40005.63 | 0.0649 | 1.6355 |
| 7 | 1248 | 25.2 | 1586.64 | 39983.43 | 0.0659 | 1.6607 |
| 7 | 1704 | 18.0 | 1588.26 | 28588.70 | 0.0652 | 1.1736 |
| 7 | 1840 | 15.0 | 1589.20 | 23838.06 | 0.0654 | 0.9810 |
| 7 | 1842 | 12.6 | 1589.22 | 20024.21 | 0.0635 | 0.8001 |
| 7 | 1386 | 7.6 | 1587.11 | 12062.01 | 0.0646 | 0.4910 |
| 7 | 1574 | 6.6 | 1587.76 | 10479.20 | 0.0656 | 0.4330 |

TABLE 4

| CELL | ID | LENGTH | LAMBDA | LAMBDA* LENGTH | SLOPE | SLOPE* LENGTH |
|---|---|---|---|---|---|---|
| 3 | 360 | 6.6 | 1581.35 | 10436.94 | 0.0763 | 0.5036 |
| 3 | 366 | 6.6 | 1581.38 | 10437.08 | 0.0763 | 0.5036 |
| 3 | 406 | 6.6 | 1581.62 | 10438.66 | 0.0742 | 0.4897 |
| 3 | 242 | 7.6 | 1580.62 | 12012.73 | 0.0742 | 0.5639 |
| 3 | 449 | 7.6 | 1581.92 | 12022.61 | 0.0744 | 0.5654 |
| 3 | 326 | 9.6 | 1581.08 | 15178.40 | 0.0789 | 0.7574 |
| 3 | 64 | 10.5 | 1578.48 | 16574.04 | 0.0747 | 0.7844 |
| 3 | 166 | 10.5 | 1580.10 | 16591.09 | 0.0776 | 0.8148 |
| 3 | 433 | 11.5 | 1581.85 | 18191.25 | 0.0766 | 0.8809 |
| 3 | 483 | 12.6 | 1582.17 | 19935.35 | 0.0743 | 0.9362 |

TABLE 4-continued

| CELL | ID | LENGTH | LAMBDA | LAMBDA* LENGTH | SLOPE | SLOPE* LENGTH |
|---|---|---|---|---|---|---|
| 3 | 414 | 14.0 | 1581.71 | 22143.87 | 0.0742 | 1.0388 |
| 3 | 4 | 15.0 | 1575.90 | 23638.44 | 0.0747 | 1.1205 |
| 3 | 26 | 16.0 | 1577.14 | 25234.21 | 0.0744 | 1.1904 |
| 3 | 39 | 17.0 | 1577.80 | 26822.57 | 0.0742 | 1.2614 |
| 3 | 47 | 17.0 | 1578.01 | 26826.10 | 0.0745 | 1.2665 |
| 3 | 95 | 17.0 | 1579.20 | 26846.40 | 0.0748 | 1.2716 |
| 3 | 415 | 24.0 | 1581.71 | 37960.97 | 0.0784 | 1.8816 |
| 3 | 420 | 24.0 | 1581.74 | 37961.74 | 0.0767 | 1.8408 |
| 3 | 365 | 25.2 | 1581.37 | 39850.57 | 0.0743 | 1.8724 |
| 3 | 369 | 25.2 | 1581.38 | 39850.83 | 0.0750 | 1.8900 |
| 3 | 370 | 25.2 | 1581.38 | 39850.85 | 0.0742 | 1.8698 |

TABLE 5

| CELL | CONCATENATED ID for pair | LENGTH for pair | LAMBDA for pair | SLOPE for pair |
|---|---|---|---|---|
| 9 | 1941 | 4 | 40.2 | 1585.51 | 0.0691 |
| 9 | 1837 | 166 | 35.7 | 1586.48 | 0.0688 |
| 9 | 1719 | 326 | 34.8 | 1586.32 | 0.0684 |
| 9 | 1492 | 366 | 31.8 | 1586.25 | 0.0673 |
| 9 | 1248 | 449 | 32.8 | 1585.55 | 0.0679 |
| 9 | 1704 | 433 | 29.5 | 1585.76 | 0.0696 |
| 9 | 1840 | 26 | 31.0 | 1582.98 | 0.0700 |
| 9 | 1842 | 47 | 29.6 | 1582.78 | 0.0698 |
| 9 | 1386 | 420 | 31.6 | 1583.03 | 0.0738 |
| 9 | 1574 | 365 | 31.8 | 1582.70 | 0.0725 |

Accordingly, a system and method have been described that advantageously optimize utilization of optical fiber reels from inventory, when filling a customer order.

It will become apparent to those skilled in the art that various modifications to the preferred embodiment of the invention as described herein can be made without departing from the spirit or scope of the invention as defined by the appended claims.

The invention claimed is:

1. A method for selecting optical fibers from inventory for use in a communication network, the method comprising the steps of:
   locating a plurality of optical fiber reels located in inventory, wherein each of the optical fibers reels exhibits a plurality of optical parameters;
   receiving a customer order, the customer order including customer requirements for at least a portion of the plurality of optical parameters and a total optical fiber length, or a standardized specification of anticipated customer requirements for at least a portion of the plurality of optical parameters and a total optical fiber length;
   selecting at least two optical parameters from the plurality of optical parameters that are included in the customer requirements or standardized requirements wherein said two optical parameters correspond to those among said plurality of optical parameters for which the greatest number of the optical fiber reels fail to meet the customer requirements or standardized requirements;
   combining a number of the optical fiber reels which individually do not meet the customeror standardized requirements into optical fiber reel pairs whose length weighted average for the selected optical parameters meet the customer requirements or standardized requirements; and selecting an appropriate number of the optical fiber reel pairs to meet the customer requirements or standardized requirements for the total optical fiber length.

2. The method of claim 1, further including the steps of:
selecting a different optical parameters from the plurality of optical parameters that are included in the customer requirements or standardized requirements; and
combining a number of the optical fiber reel pairs into pairs of optical fiber reel pairs that also meet the customer requirements or standardized requirements for the selected different optical parameters.

3. The method of claim 1, wherein the plurality of optical parameters are selected from the group consisting of a maximum attenuation at a selected wavelength, a maximum attenuation with bending, a difference in attenuation across a wavelength range, a zero dispersion wavelength range, a zero dispersion slope range and a maximum polarization mode dispersion, effective area, mode filed diameter, or a combination thereof.

4. The method of claim 1, wherein a length weighted average of the selected two optical parameters for the given optical fiber reel pair meets the customer requirements for the selected two optical parameters.

5. The method of claim 1, wherein said combining a number of optical fiber reels comprises combining at least a first reel of fiber of a first type having a negative dispersion and negative dispersion slope at 1550 nm with that of a second reel of a second type having a positive, dispersion and positive dispersion slope at 1550 nm, to thereby arrive at a optimized dispersion managed fiber combination.

6. The method of claim 5, further comprising combining a first length of fiber of a first type having negative dispersion and negative dispersion slope at 1550 nm with a second length of fiber of the first type having negative dispersion and negative dispersion slope at 1550, said two reels of fiber having properties for dispersion and dispersion slope that are located on opposite sides of a desired target distribution, and combining said combined length of negative dispersion fibers with said second type of fiber having positive dispersion and positive dispersion slope at 1550 nm, to thereby form a length of dispersion managed fiber.

7. The method of claim 5, wherein said first reel of fiber exhibits negative dispersion and negative dispersion slope at 1550 nm which is lower or higher than a desired target distribution for said first fiber, and said second reel of fiber exhibits positive dispersion and dispersion slope at 1550 nm which is lower or higher than a desired target distribution for said second fiber, and said combining step comprises combining a fiber having a dispersion or slope that is lower than the desired target for that fiber with a fiber having a dispersion or slope which is higher than the desired target for that fiber.

8. An optical fiber selection system for automatically selecting optical fibers from inventory for use in a communication network, the system comprising:
a user computer system; and
a vendor computer system in communication with the user computer system, the vendor computer system executing code for performing the steps of:
accessing information on a plurality of optical fiber reels located in inventory, wherein the information includes a plurality of optical parameters for each of the plurality of optical fiber reels;
receiving a customer order, the customer order including customer requirements for at least a portion of the plurality of optical parameters and a total optical fiber length, or a standardized specification of anticipated customer requirements for at least a portion of the plurality of optical parameters and a total optical fiber length;
selecting two optical parameters from the plurality of optical parameters that are included in the customer requirements or standardized requirements;
combining a number of the optical fiber reels which individually do not meet the customer or standardized requirements into optical fiber reel pairs whose length weighted average for the selected two optical parameters meet the customer requirements or standardized requirements; and
selecting an appropriate number of the optical fiber reel pairs to meet the customer requirements or standardized requirements for the total optical fiber length.

9. The system of claim 8, wherein the two selected optical parameters correspond to those for which the greatest number of the optical fiber reels fail to meet the customer requirements.

10. The system of claim 8, wherein the code is configured to allow the vendor computer system to perform the additional steps of:
selecting a different two optical parameters from the plurality of optical parameters that are included in the customer requirements; and
combining a number of the optical fiber reel pairs into pairs of optical fiber reel pairs that also meet the customer requirements for the selected different two optical parameters.

11. The system of claim 10, wherein a length weighted average of the selected different two optical parameters for the given pair of the optical fiber reel pairs meet the customer requirements for the selected different two optical parameters.

12. The system of claim 8, wherein the optical fiber reels are designed for submarine applications.

13. The system of claim 8, wherein the plurality of optical parameters are selected from the group consisting of a maximum attenuation at a selected wavelength, a maximum attenuation with bending, a difference in attenuation across a wavelength range, a zero dispersion wavelength range, a zero dispersion slope range, a maximum polarization mode dispersion, effective area, mode filed diameter, or combinations thereof.

14. The system of claim 8, wherein the code is configured to allow the vendor computer system to perform the additional step of:
presorting each of the optical fiber reels into a cell of a grid based on the values of the selected two optical parameters, wherein one of the selected two optical parameters is mapped along an ordinate of the grid and a remaining one of the selected two optical parameters is mapped along an abscissa of the grid.

15. The system of claim 14, wherein the grid includes nine cells.

16. The system of claim 8, wherein a length weighted average of the selected two optical parameters for the given optical fiber reel pair meets the customer requirements for the selected two optical parameters.

17. The system of claim 8, wherein the vendor computer system and the user computer system communicate via one of a dial-up connection, a local area network (LAN) and the Internet.

18. A method for selecting optical fibers from inventory for use in a communication network, the method comprising the steps of:

locating a plurality of optical fiber reels located in inventory, wherein each of the optical fibers reels exhibits a plurality of optical parameters;

receiving a customer order, the customer order including customer requirements for at least a portion of the plurality of optical parameters and a total optical fiber length, or a standardized specification of anticipated customer requirements for at least a portion of the plurality of optical parameters and a total optical fiber length;

selecting at least two optical parameters from the plurality of optical parameters that are included in the customer requirements or standardized requirements wherein said two optical parameters correspond to those among said plurality of optical parameters for which the greatest number of the optical fiber reels fail to meet the customer requirements or standardized requirements;

presorting each of the optical fiber reels into a cell of a grid based on the values of the selected two optical parameters, wherein one of the selected two optical parameters is mapped along an ordinate of the grid and a remaining one of the selected two optical parameters is mapped along an abscissa of the grid;

combining a number of the optical fiber reels which individually do not meet the customer or standardized requirements into optical fiber reel pairs whose length weighted average for the selected optical parameters meet the customer requirements or standardized requirements; and selecting an appropriate number of the optical fiber reel pairs to meet the customer requirements or standardized requirements for the total optical fiber length.

19. The method of claim 18, wherein the grid includes at least nine cells.

* * * * *